US012520072B2

(12) United States Patent
Watanabe

(10) Patent No.: US 12,520,072 B2
(45) Date of Patent: Jan. 6, 2026

(54) MIXING DEVICE AND MIXING METHOD

(71) Applicant: Roland Corporation, Shizuoka (JP)

(72) Inventor: Masakazu Watanabe, Shizuoka (JP)

(73) Assignee: Roland Corporation, Shizuoka (JP)

( * ) Notice: Subject to any disclaimer, the term of this patent is extended or adjusted under 35 U.S.C. 154(b) by 252 days.

(21) Appl. No.: 18/311,889

(22) Filed: May 3, 2023

(65) Prior Publication Data

US 2023/0412964 A1 Dec. 21, 2023

(30) Foreign Application Priority Data

Jun. 10, 2022 (JP) ................................ 2022-094506

(51) Int. Cl.
*H04R 1/10* (2006.01)
*H04R 3/00* (2006.01)

(52) U.S. Cl.
CPC ............ *H04R 1/1041* (2013.01); *H04R 3/00* (2013.01)

(58) Field of Classification Search
CPC .......... H04R 3/00; H04R 1/1041; H04R 5/04; H04R 5/033; H04R 1/028; H04R 3/007; H04R 2430/01; H04R 3/005; H04R 29/008; H04R 2499/15
USPC ........................................... 381/109, 119, 74
See application file for complete search history.

(56) References Cited

U.S. PATENT DOCUMENTS 8,064,621 B2 * 11/2011 Terada .................... H04S 1/007 84/625
9,584,084 B2 * 2/2017 Chen ........................ H03G 3/20
11,013,989 B2 * 5/2021 Kuruba Buchannagari ................ G06F 3/165
11,119,724 B2 * 9/2021 O'Donnell ................ H04S 7/00
11,483,651 B2 * 10/2022 Rämö ................ G10L 21/0208
11,660,530 B2 * 5/2023 Kuruba Buchannagari ................ A63F 13/25 381/104
11,849,290 B2 * 12/2023 Kikuhara ................ H04R 3/00
2008/0226086 A1 9/2008 Kageyama et al.
2011/0130203 A1 6/2011 Reiss et al.
2017/0201832 A1 7/2017 Reynolds, Jr. et al.

OTHER PUBLICATIONS

Elgato, "WAVE:3 Start Guide," published on May 2021, with English translation thereof, available at: https://www.elgato.com/sites/default/files/2021-05/Get_Started_Guides_Wave_3_compressed.pdf.
"Office Action of Europe Counterpart Application", issued on May 13, 2024, p. 1-p. 5.

(Continued)

*Primary Examiner* — Disler Paul
(74) *Attorney, Agent, or Firm* — JCIPRNET

(57) ABSTRACT

A mixing device is provided. The mixing device includes: an input unit, inputting sounds; multiple output units, outputting the sounds; a sound setting operator, setting a sound setting value that is a setting value relating to the sounds; a selection operator, selecting the output unit of a target for setting the sound setting value; a setting value acquisition means, acquiring the sound setting value set by the sound setting operator with respect to the output unit selected by the selection operator; and a mixing means, for each of the output units, mixing the sounds input at the input unit based on the sound setting value corresponding to the output unit and being the sound setting value acquired by the setting value acquisition means.

18 Claims, 10 Drawing Sheets

(56) References Cited

OTHER PUBLICATIONS

"Search Report of Europe Counterpart Application", issued on Nov. 21, 2023, p. 1-p. 8.
Vincent Burel, "Voicemeeter information / quick start guide", Oct. 13, 2014, Available at: https://forum.vb-audio.com/viewtopic.php?t=87, pp. 1-6.
"Office Action of Europe Counterpart Application", issued on Oct. 22, 2024, pp. 1-5.
"Office Action of Europe Counterpart Application", issued on Mar. 6, 2025, p. 1-p. 4.

* cited by examiner (a)

(b)

(c)

(a)

(b)

Setting value table 11b

| Operator | Target output destination | Sound setting value | |
|---|---|---|---|
| | | Volume setting value | Acoustic effect degree |
| First operator | Distribution contents | 30 | 20 |
| | Headset | 50 | 0 |
| Second operator | Distribution contents | 59 | 0 |
| | Headset | 1 | 0 |
| Third operator | Distribution contents | 44 | 30 |
| | Headset | 32 | 40 |

FIG. 6

MIXING DEVICE AND MIXING METHOD

CROSS-REFERENCE TO RELATED APPLICATION

This application claims the priority benefit of Japanese Application Serial No. 2022-094506, filed on Jun. 10, 2022. The entirety of the above-mentioned patent application is hereby incorporated by reference herein and made a part of this specification.

BACKGROUND

Technical Field

The invention relates to a mixing device and a mixing method.

Description of Related Art

Non-patent Document 1 discloses an application software (briefly referred to as "application" in the following) in which multiple input sounds, such as sounds of a gaming machine or chat sounds, background music (BGM), etc., are mixed and output to multiple output destinations, such as a headphone and an Internet distribution destination of game play motion pictures. On the screen of the application, a volume operation part which changes the volume of each input sound and an output destination operation part which specifies the output destination to change the volume by using the volume operation part are displayed, and, with the user operating the volume operation part or the output destination operation part via a mouse, etc., the volume can be changed, or the output destination to change the volume can be specified.

PRIOR ART DOCUMENTS

Non-Patent Document

[Non-patent Document 1] [Searched on Jun. 8, 2022] Internet URL: https://www.elgato.com/sites/default/files/2021-05/Get_Started_Guides_Wave_3_compressed.pdf However, in the application of Non-patent Document 1, in the case of changing the volume, etc., during game play, the game play operation needs to pause, the screen needs to be switched to the application, and the operation part needs to be operated by using a mouse, etc. Since such troublesome operation for changing the volume, etc., may causes interference with game play, there is a concern that an adverse effect may be exerted on play results, and the viewer of the game pictures that are distributed may feel uncomfortable.

SUMMARY

In order to achieve the objective, an aspect of the invention provides a mixing device. The mixing device includes: an input unit, inputting sounds; multiple output units, outputting the sounds; a sound setting operator, setting a sound setting value that is a setting value relating to the sounds; a selection operator, selecting the output unit of a target for setting the sound setting value; a setting value acquisition means, acquiring the sound setting value set by the sound setting operator with respect to the output unit selected by the selection operator; and a mixing means, for each of the output units, mixing the sounds input at the input unit based on the sound setting value corresponding to the output unit and being the sound setting value acquired by the setting value acquisition means.

Another aspect of the invention provides a mixing method executed by a mixing device. The mixing device includes: an input unit, inputting sounds; multiple output units, outputting the sounds; a sound setting operator, setting a sound setting value that is a setting value relating to the sounds; and a selection operator, selecting the output unit of a target for setting the sound setting value. The mixing method includes: a setting value acquisition step of acquiring the sound setting value set by the sound setting operator with respect to the output unit selected by the selection operator; and a mixing step of, for each of the output units, mixing the sounds input at the input unit based on a sound setting value corresponding to the output unit and being the sound setting value acquired at the setting value acquisition step.

Figure 2:
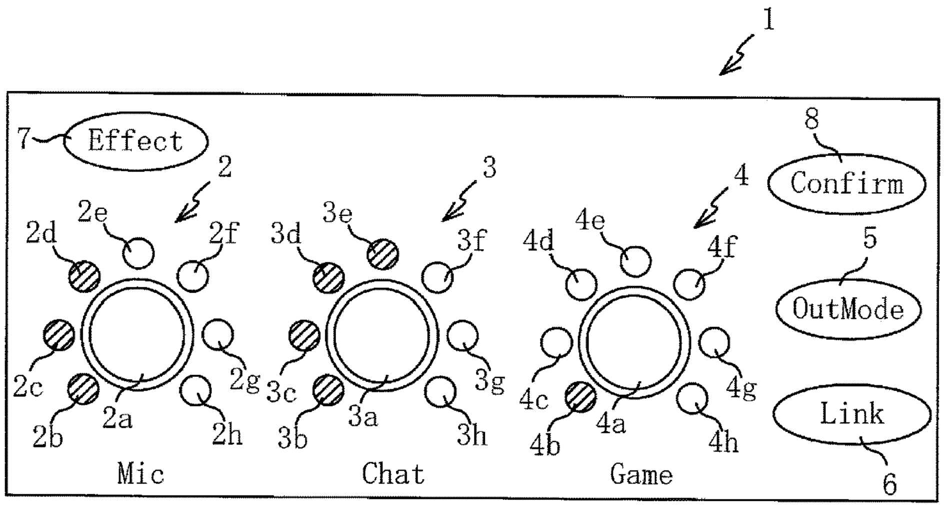
Figure 2:
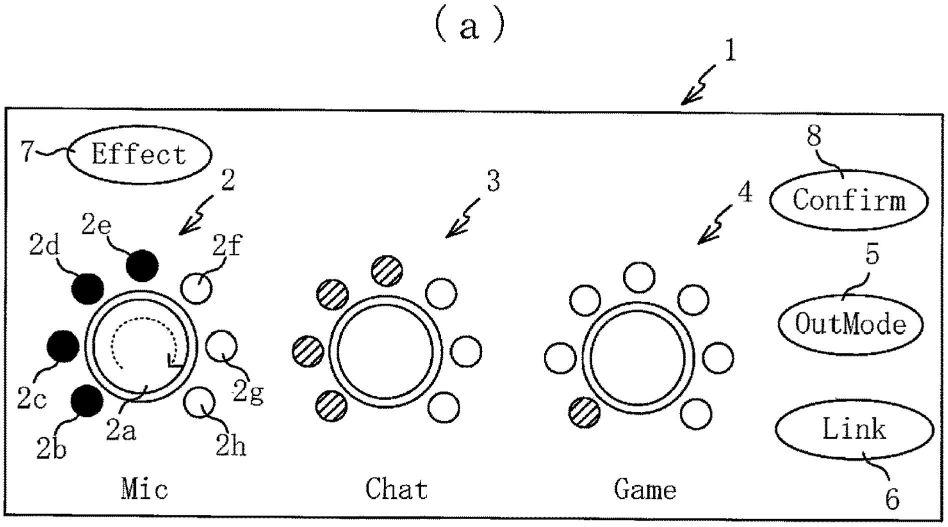
Figure 2:
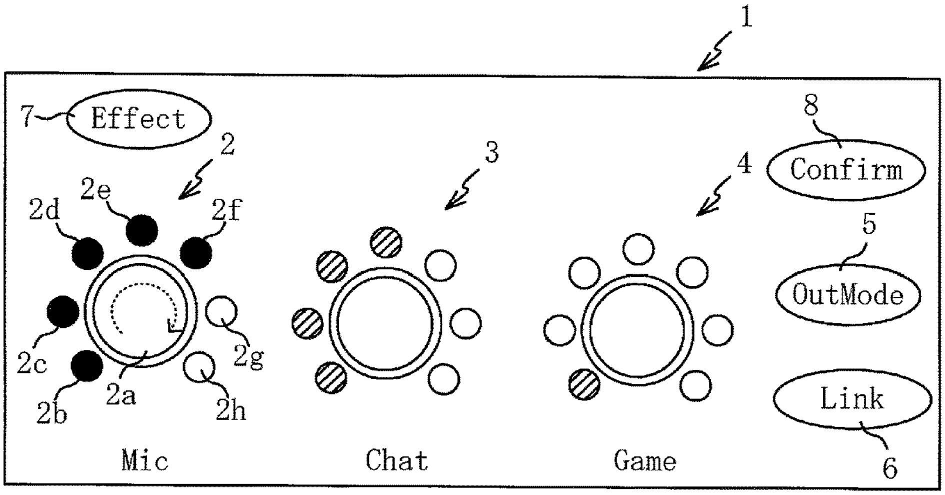

(a) of FIG. 2 is a top view of the mixing device, (b) of FIG. 2 is a top view of the mixing device immediately after a knob operation is started, and (c) of FIG. 2 is a top view of the mixing device in the middle of the knob operation.

Figure 3:
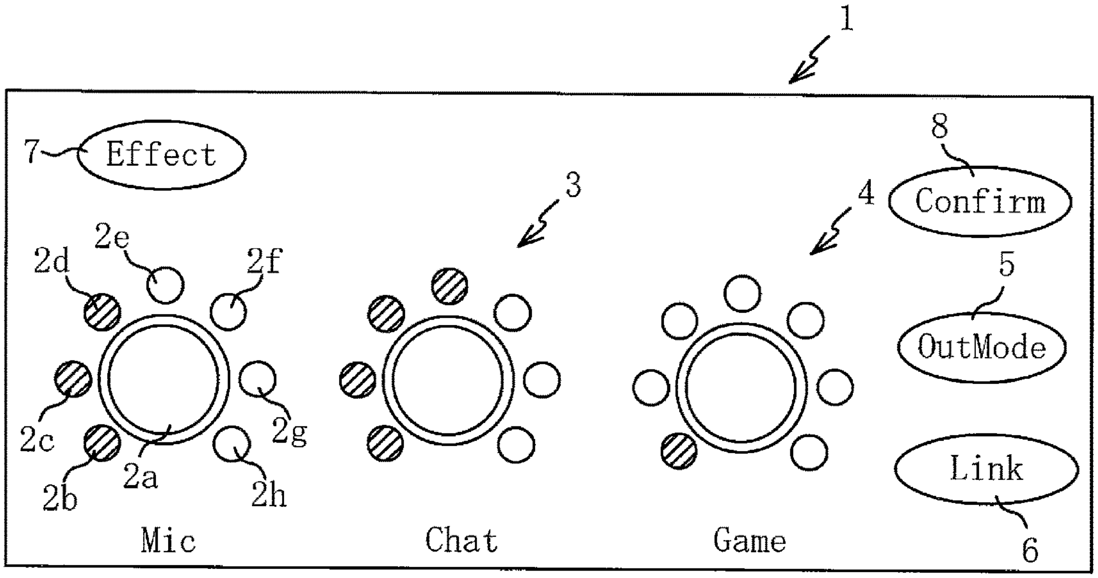
Figure 3:
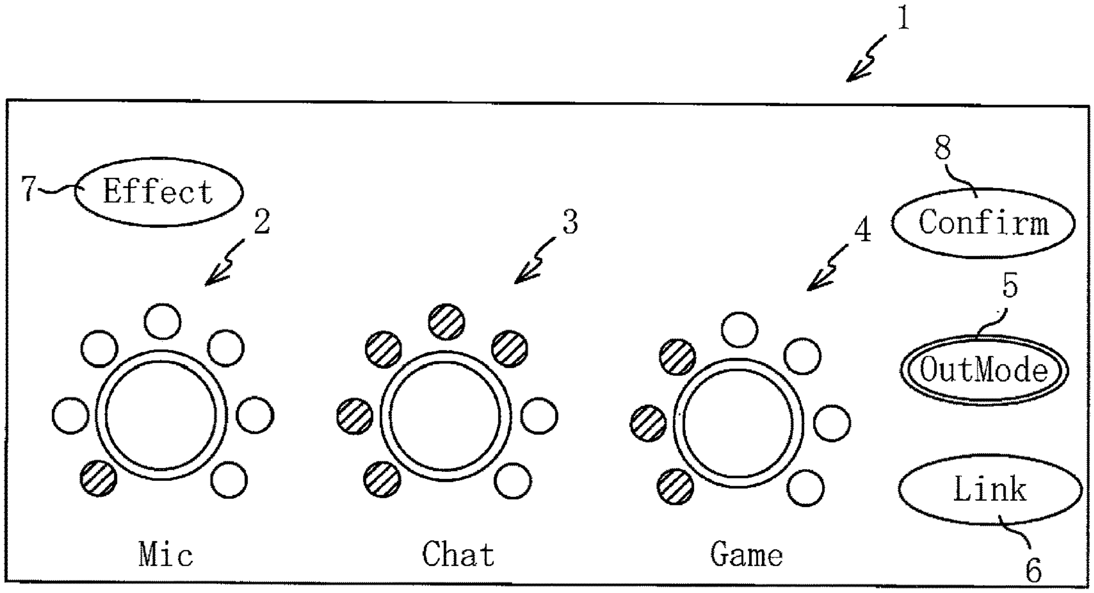

(a) of FIG. 3 is a top view of the mixing device in a case where a target output destination button is OFF, and (b) of FIG. 3 is a top view of the mixing device in a case where the target output destination button is ON.

Figure 4:
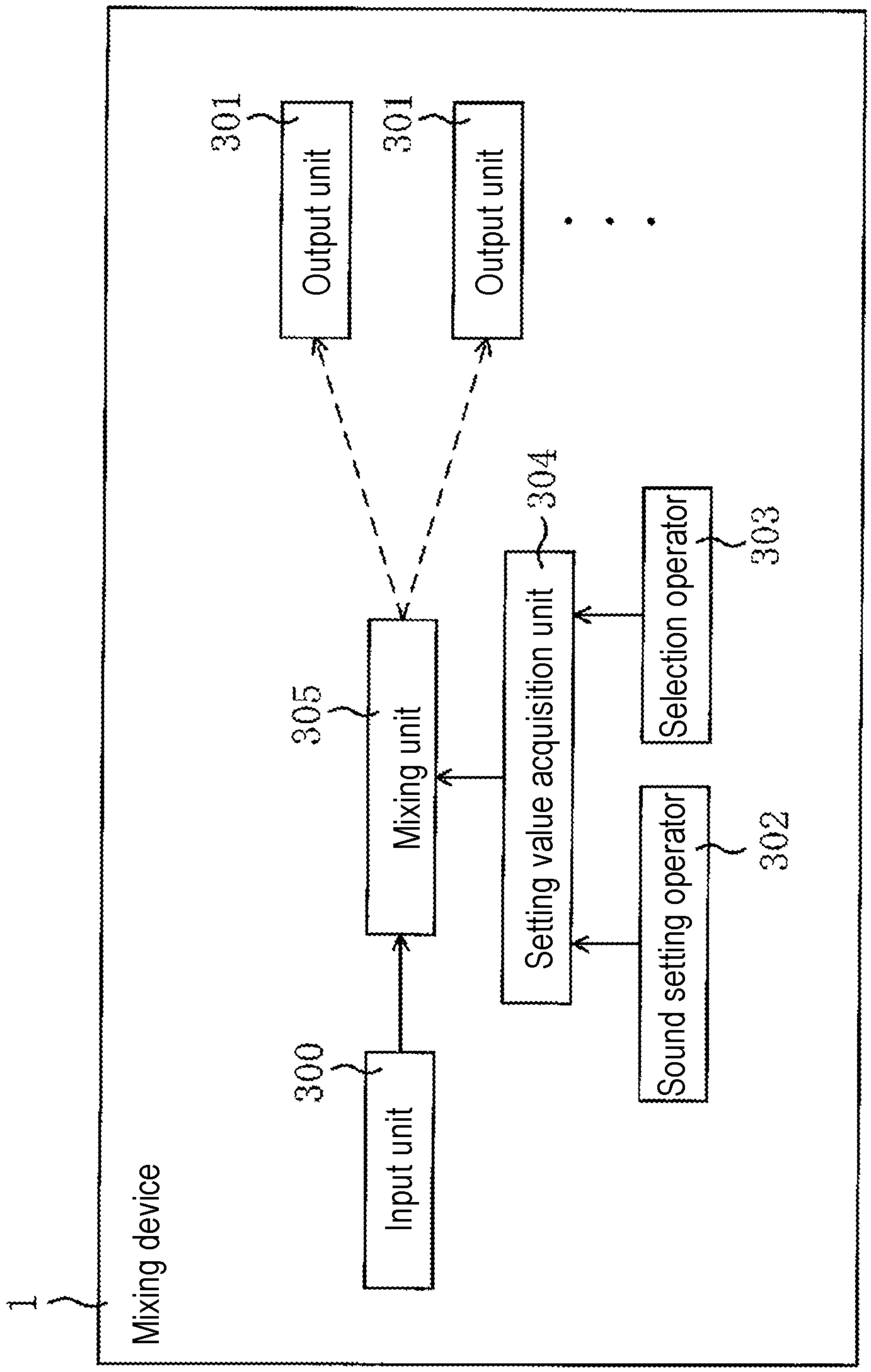

FIG. 4 is a functional block diagram of the mixing device.

Figure 5:
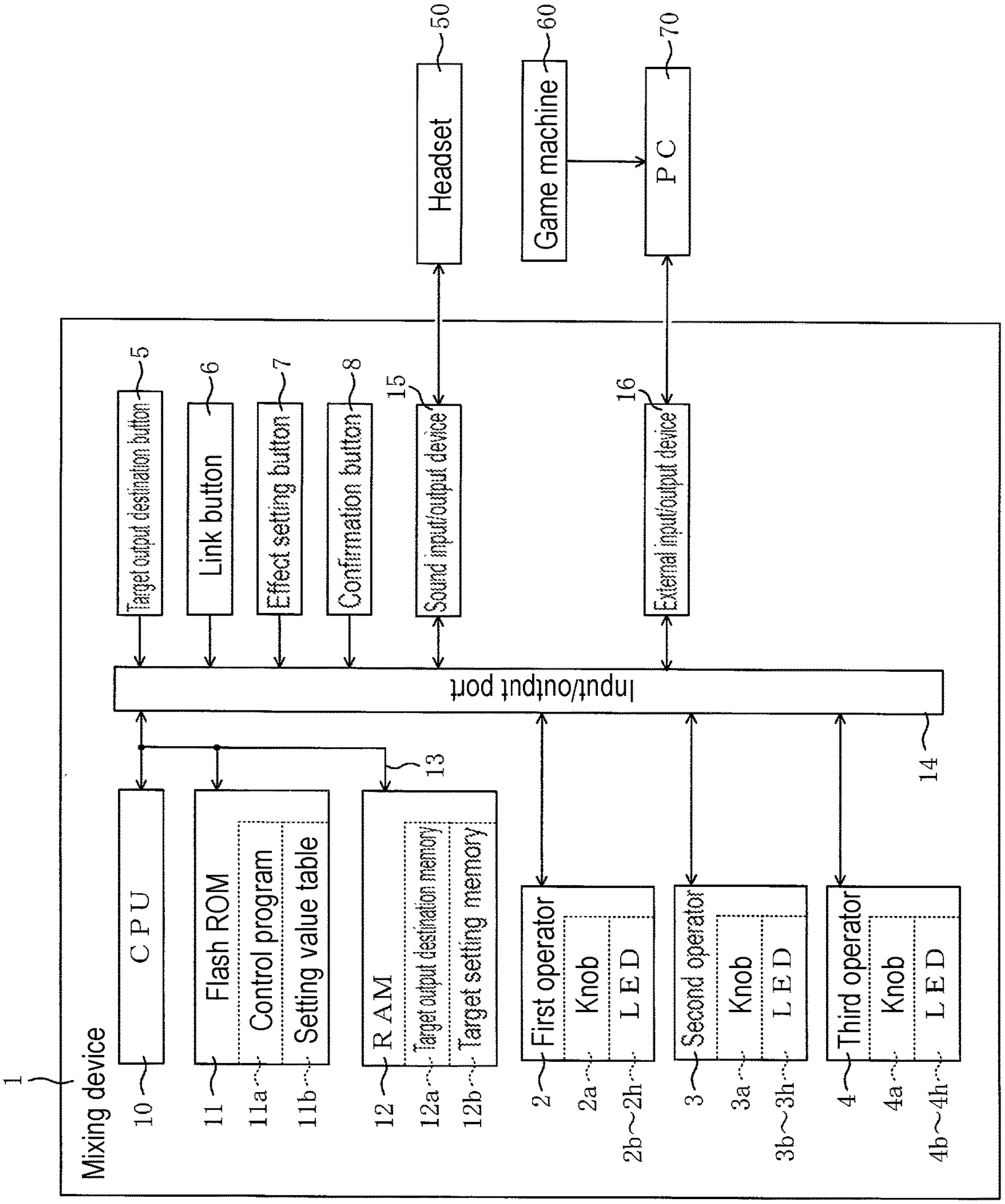

FIG. 5 is a block diagram illustrating an electrical configuration of the mixing device.

FIG. 6 is a diagram schematically illustrating a setting value table.

Figure 7:
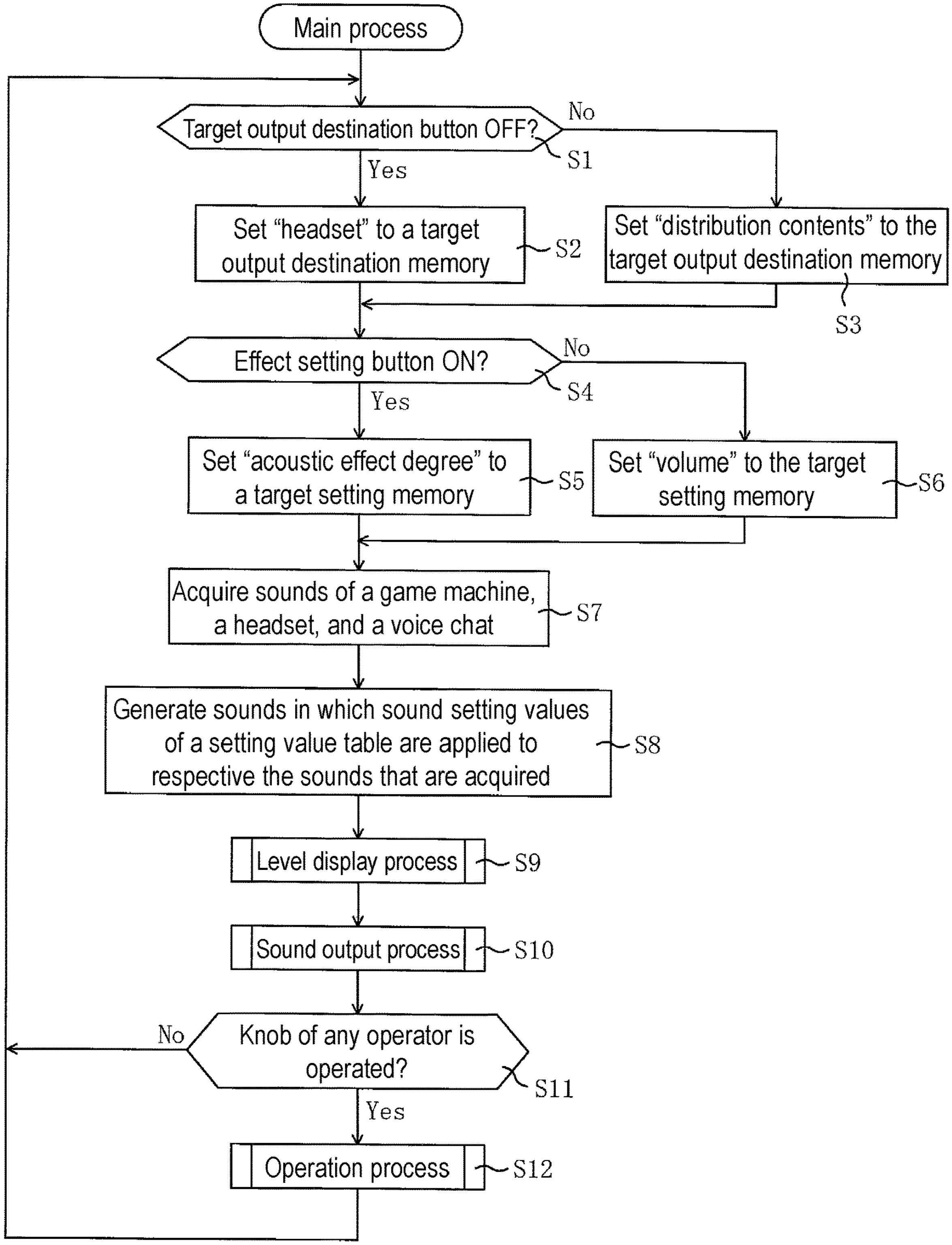

FIG. 7 is a flowchart of a main process.

Figure 8:
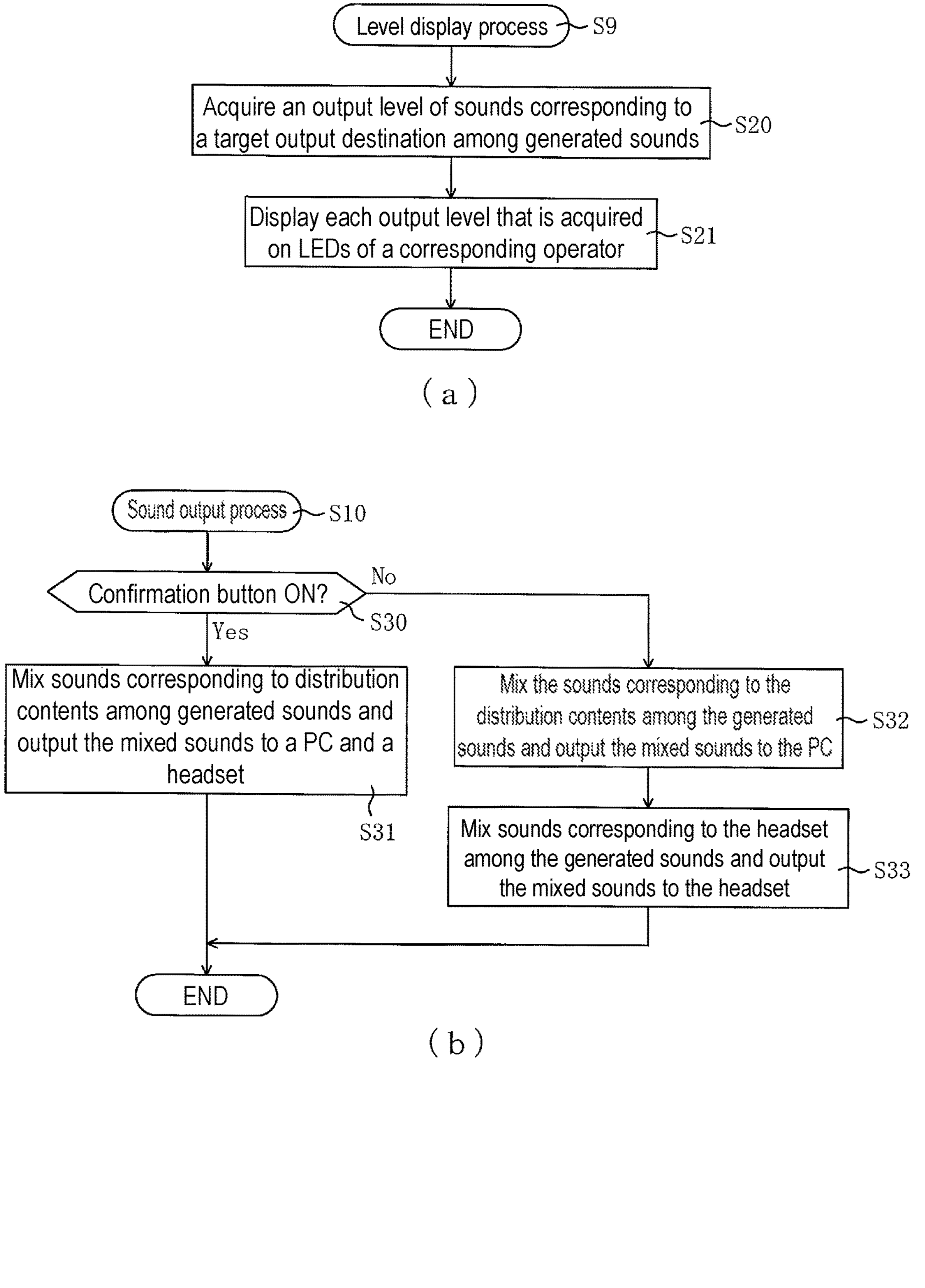

(a) of FIG. 8 is a flowchart of a level display process, and (b) of FIG. 8 is a flowchart of a sound output process.

Figure 9:
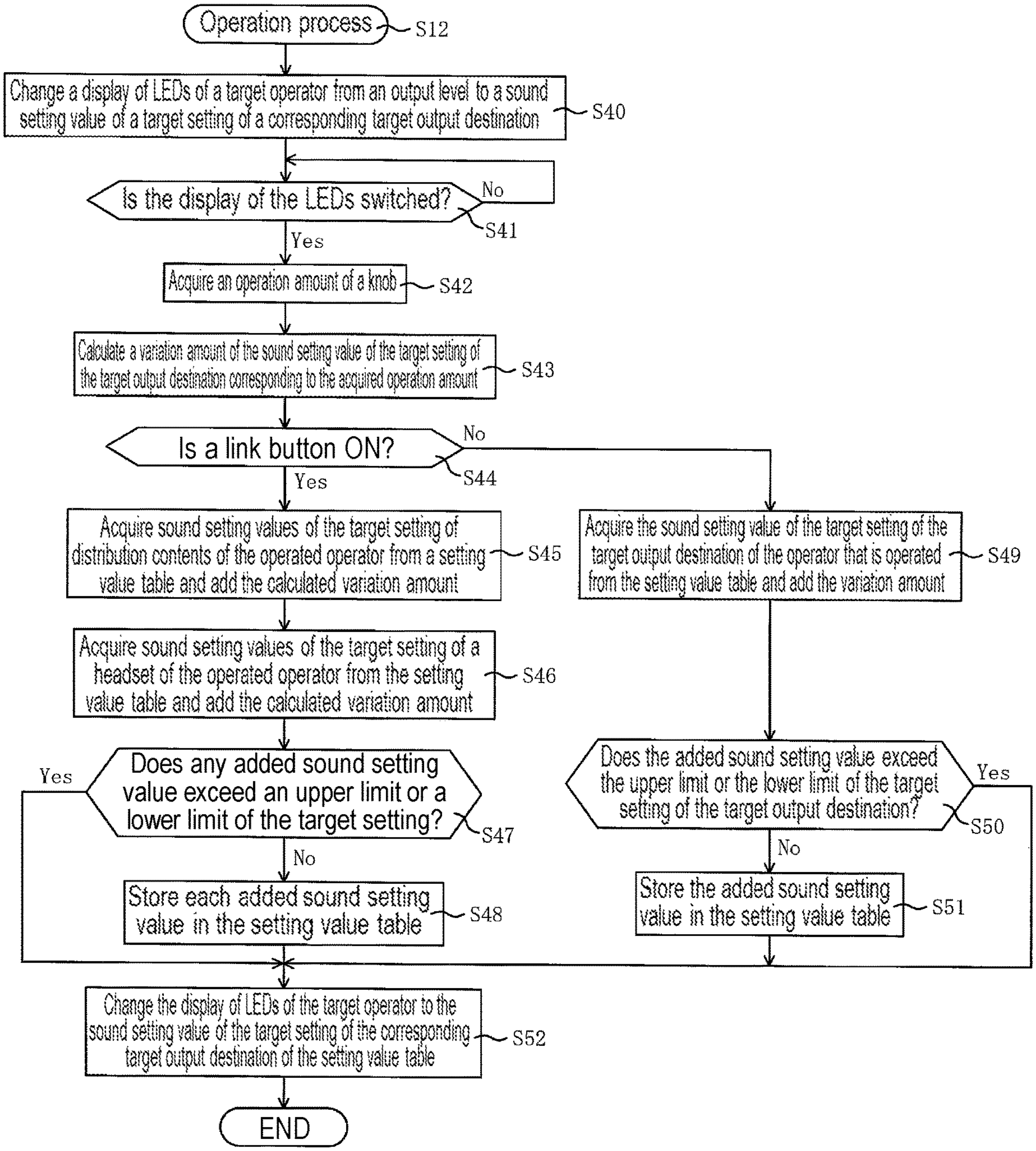

FIG. 9 is a flowchart of an operation process.

Figure 10:
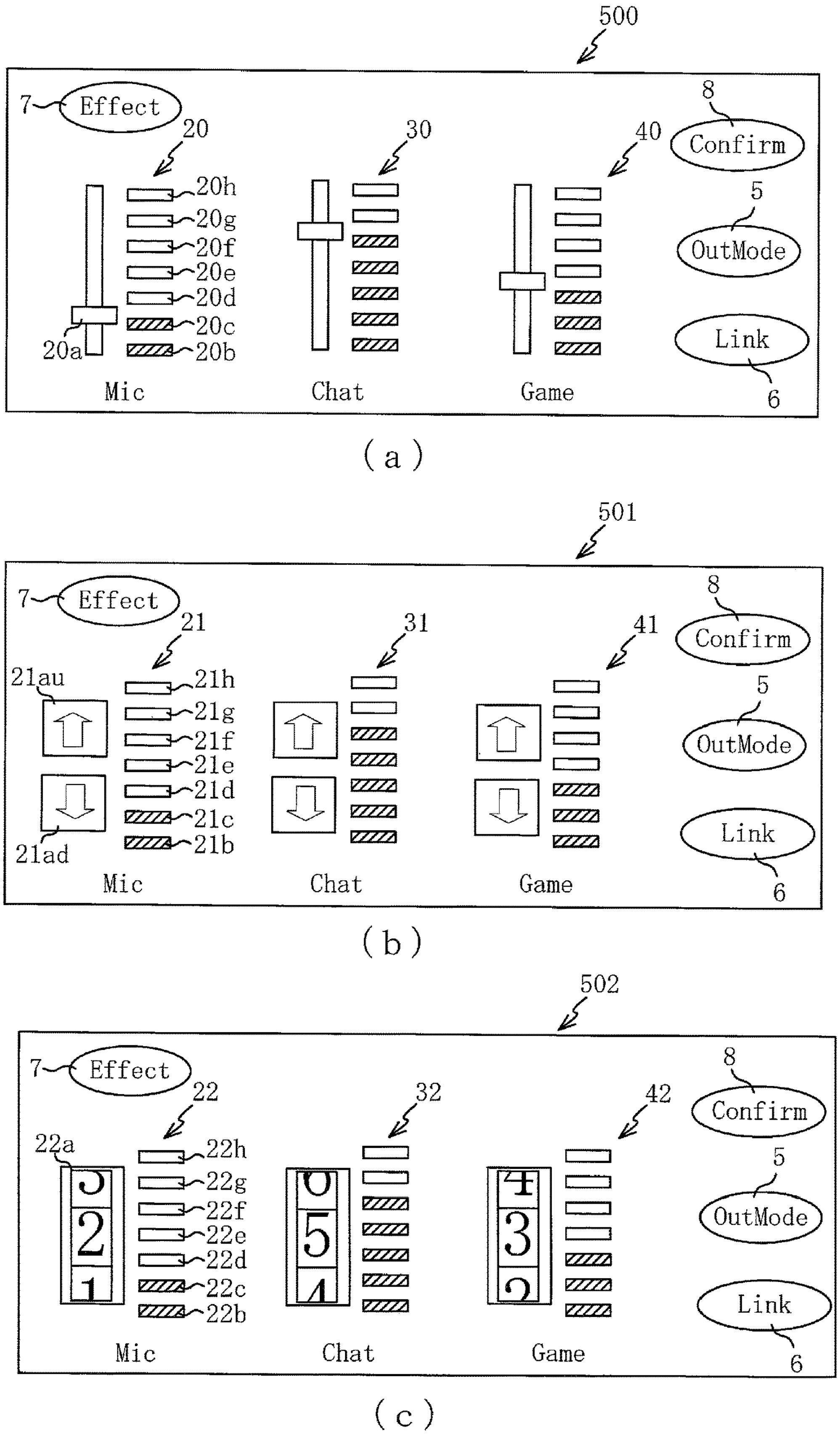

(a) of FIG. 10 is a top view of a mixing device in a modified example, (b) of FIG. 10 is a top view of a mixing device in another modified example, and (c) of FIG. 10 is a top view of a mixing device in yet another modified example.

DESCRIPTION OF THE EMBODIMENTS

Figure 1:
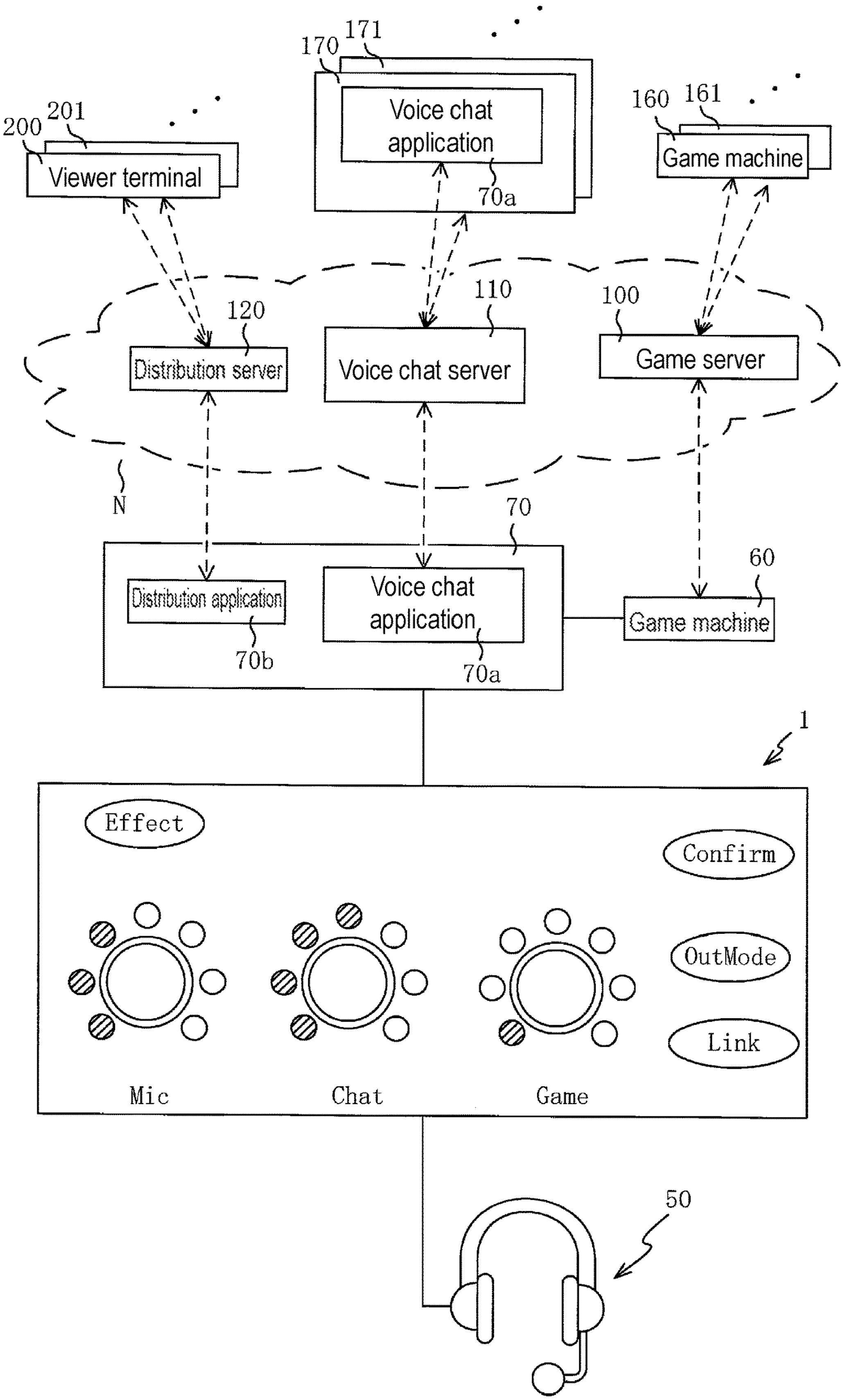
FIG. 1 is a schematic view illustrating a mixing device according to an embodiment.

In the following, the exemplary embodiments are described with reference to the accompanying drawings. A mixing device 1 according to an embodiment is schematically described with reference to FIG. 1. FIG. 1 is a view illustrating an appearance of the mixing device 1. The mixing device 1 is a device that mixes (synthesizes) multiple sounds that are input and outputs mixed sounds to multiple output destinations. A headset 50 and a PC 70 are connected to the mixing device 1.

The headset 50 is an input/output device having a microphone which inputs sounds and a headphone which outputs sounds. The headset 50 is worn by the user H. A sound generated by the user H is input from the microphone to the mixing device 1, and the sound is further input to the PC 70 from the mixing device 1. In addition, a sound from the mixing device 1 is input to the headphone.

The PC 70 is an information processing device (computer) outputting, to a distribution server 120, motion pictures and sounds from a game machine 60 that is connected and sound exchanges through a voice chat application 70*a* to be described afterwards. The game machine 60 of the embodiment is configured to be connected to other game machines 160, 161, etc., via a game server 100 and capable of player-versus-player (PvP) game play through a game among the game machine 60 and the game machines 160, 161, etc. The game play motion pictures and sounds from the PvP game play with the other game machines 160, 161, etc., are output from the game machine 60 to the PC 70, and the sounds among the game play motion pictures and sounds are output from the PC 70 to the mixing device 1.

The PC 70 is mainly installed with the voice chat application 70*a* and a distribution application 70*b*. The voice chat application 70*a* is an application software for exchanges through voice (i.e., voice chat) with other PCs 170, 171, etc., connected to a voice chat server 110 connected on the Internet N.

The sounds of the user H playing the game machine 60 input from the headset 50 via the mixing device 1 are transmitted to the voice chat server 110, and the sounds are transmitted from the voice chat server 110 to the voice chat applications 70*a* of the other PCs 170, 171, etc.

Meanwhile, in the embodiment, the users H of the other game machines 160, 161, etc., and the users H of the PCs 170, 171, etc., are the same, and the sounds of the users H playing the game by using the game machines 160, 161, etc., are transmitted to the voice chat server 110 via the voice chat applications 70*a* of the PCs 170, 171, etc., and transmitted from the voice chat server 110 to the voice chat application 70*a* of the PC 70.

Then, the sounds received by the voice chat application 70*a* of the PC 70 are output to the mixing device 1, and output from the mixing device 1 to the headset 50. In this way, the voice chat among the user H of the PC 70 and the users H of the other PCs 170, 171, etc., are realized.

The distribution application 70*b* is an application software that generates distribution contents and transmits the distribution contents to the distribution server 120. The distribution contents are contents formed by game play motion pictures from the game machine 60, sounds of the voice chat (simply referred to as "voice chat sounds" in the following) received from the other PCs 170, 171, etc., by using the voice chat application 70*a* and sounds input from the microphone of the headset 50 (simply referred to as "microphone sounds" in the following). While details will be described in the following, the sounds mixed by the mixing device 1 are used for the sounds among the distribution contents, i.e., the sounds of the game machine 60, the voice chat sounds, and the microphone sounds.

The generated distribution contents are transmitted from the distribution application 70*b* to the transmission server 120, and the distribution contents transmitted to the distribution server 120 are distributed to viewer terminals 200, 201, etc. By playing the distribution contents distributed to the viewer terminals 200, 201, etc., the play motion pictures and the sounds thereof from the game machine 60, and the voice chat among the users H at such time can be viewed by the users H of the viewer terminals 200, 201, etc. Although a PC, a mobile terminal, and a table terminal are shown, as examples, as the viewer terminals 200, 201, etc., in the embodiment, the viewer terminals may also be information processing devices other than the above.

According to the above, the sounds output from the mixing device 1 in the embodiment are mainly of two types, i.e., the sounds output from the headphone of the headset 50 and the sounds included in the distribution contents. The sounds output from the headphone of the headset 50 and the sounds included in the distribution contents are both sounds in which the sounds from the game machine 60, the voice chat sounds and the microphone sounds are mixed.

However, in the sounds output from the headset 50 and the sounds included in the distribution contents, there are cases where it is intended to vary the respective volume setting values (volumes) or degrees of acoustic effects (e.g., reverb, delay, etc.) for the sounds from the game machine 60, etc.

Therefore, the mixing device 1 of the embodiment is configured to be able to easily and intuitively change the respective volumes and sound effect degrees of the sounds output from the headset 50 and the sounds included in the distribution contents. The setting of the volume setting values or the degrees of the acoustic effects of the sounds in the mixing device 1 is described with reference to FIGS. 2 and 3.

(a) of FIG. 2 is a top view of the mixing device 1, (b) of FIG. 2 is a top view of the mixing device 1 immediately after an operation on a knob 2*a* is started, and (c) of FIG. 2 is a top view of the mixing device in the middle of the operation on the knob 2*a*. As shown in (a) of FIG. 2, the mixing device 1 is provided with a first operator 2, a second operator 3, a third operator 4, a target output destination button 5, a link button 6, an effect setting button 7, and a confirmation button 8.

The first operator 2 is a member for setting the volume setting value or the acoustic effect degree of the sounds input from the microphone. In the following, a sound-related parameter such as sounds or acoustic effects, is referred to as "sound setting", and a setting value of sound setting, such as the volume setting value or the acoustic effect degree of the sounds are referred to as a "sound setting value".

The first operator 2 is provided with the knob 2*a* and light emitting diodes (LEDs) 2*b* to 2*h*. The knob 2*a* is a rotation-type operator formed in a circular shape when viewed in a top view, and is a component that changes (sets) the sound setting value corresponding to the microphone sounds. Specifically, by rotating the knob 2*a* rightward (clockwise direction), the sound setting value is increased, and by rotating the knob 2*b* leftward (counterclockwise direction), the sound setting value is decreased.

In addition, the knob 2*a* is configured to be able to limitlessly rotate in the operation direction (rightward or leftward). Accordingly, even if the knob 2*a* keeps rotating rightward, the rotation thereof does not stop halfway, and even if the knob 2*a* keeps rotating leftward, the rotation thereof does not stop halfway.

The LEDs 2*b* to 2*h* are a display device provided along the outer circumference of the knob 2*a*. The LEDs 2*b* to 2*h* display one of the sound setting value applied to the microphone sounds and a real-time output level (level meter) of the sounds as a result of applying the sound setting value to the microphone sounds. LED 2*b*→LED 2*c*→LED 2*d*→LED 2*e*→LED 2*f*→LED 2*g*→LED 2*h* are lit up in an order in which the sound setting value or the output level increases.

In the embodiment, the sound setting value or the output level is provided for each output destination of the mixed sounds, that is, for each of the headset 50 and the distribution contents. Among the output destinations, an output destination of a target (referred to as "target output destination") whose the sound setting value (i.e., the volume setting value or the degree of the acoustic effect of the sounds) is displayed by the LEDs 2*b* to 2*h* and changed by the knob 2*a* is configured to be switchable by the target output destination button 5 to be described afterwards. Accordingly, the LEDs 2*b* to 2*h* display the sound setting value or the output level corresponding to the output destination in accordance with the setting state of the target output destination button 5.

In addition, the switching between the display of the sound setting value and the display of the output level by using the LEDs 2*b* to 2*h* is carried out in accordance with the rightward or leftward operation of the knob 2*a*. (a) of FIG. 2 illustrates a state in which the user H is not operating the knob 2*a*. In such case, the LEDs 2*b* to 2*h* display the output level. In (a) to (c) of FIG. 2 and the subsequent drawings, the display of the LEDs 2*b* to 2*h* in the case of the output level is indicated by hatching of the LEDs 2*b* to 2*h*.

When intending to increase the sound setting value in such state, the user H rotates the knob 2*a* rightward. By doing so, as shown in (b) of FIG. 2, the display of the LEDs 2*b* to 2*h* is switched to the sound setting value. At this time, the display mode (e.g., the lighting color) of the LEDs 2*b* to 2*h* may be changed to a mode different from that of the output level. In (a) to (c) of FIG. 2, the display of the LEDs 2*b* to 2*h* is shown in black in the case of the sound setting value. Here, the knob 2*a* is operated and there is a time lag until the display of the LEDs 2*b* to 2*h* is changed from the output level to the sound setting value. Therefore, there are also cases where the output level is displayed on the LEDs 2*b* to 2*h* even though the knob 2*a* is operated. In such case, if the sound setting value is changed in accordance with the operation of the knob 2*a*, there is a concern that a sound setting value unexpected by the user H is set.

Therefore, in the period between the time when the knob 2*a* is operated and the display of the LEDs 2*b* to 2*h* is changed from the output level to the sound setting value, a change of the sound setting value through the operation of the knob 2*a* is not accepted, and a change of the sound setting value through the operation of the knob 2*a* is received after the display of the LEDs 2*b* to 2*h* is changed to the sound setting value (see (c) of FIG. 2). Accordingly, since it is possible to change the sound setting value by operating the knob 2*a* only in the state in which the user H can visually recognize the sound setting value, a situation in which a sound setting value unexpected by the user H is set can be suppressed.

In addition, in the case where the sound setting value is increased by rotating the knob 2*a* rightward, the LEDs are lid up accordingly in the order of LED 2*b*→LED 2*c*→LED 2*d*→LED 2*e*→LED 2*f*→LED 2*g*→LED 2*h*. On the contrary, in the case where the sound setting value is decreased by rotating the knob 2*a* leftward, the LEDs are turned off accordingly in the order of LED 2*h*→LED 2*g*→LED 2*f*→LED 2*e*→LED 2*d*→LED 2*c*→LED 2*b*.

That is, the operation direction of the knob 2*a* for increasing/decreasing the sound setting value conforms to the direction of lighting up/turning off the LEDs 2*b* to 2*h*. Accordingly, since a sense of conformity is provided between the increase/decrease in the sound setting value by operating the knob 2*a* and the ON/OFF of the LEDs 2*b* to 2*h*, the user H can set the sound setting value intuitively by using the knob 2*a*.

In addition, by switching the display of the LEDs 2*b* to 2*h* between the output level and the sound setting value in accordance with the operation of the knob 2*a*, the output level of the sounds actually output when setting the sound setting value can be confirmed or compared. With this as well, the user H can set the sound setting value intuitively. Moreover, by displaying both the output level and the sound setting value on the LEDs 2*b* to 2*h*, it is not required to provide a display device for each of the output level and the sound setting value. Accordingly, the mixing device 1 can be configured in a compact manner, and the manufacturing cost of the mixing device can be reduced.

The second operator 3 is a member for setting the volume setting value or the degree of the acoustic effect of the voice chat sounds, and is provided with a knob 3*a* and LEDs 3*b* to 3*h*. The knob 3*a* is a rotation-type operator formed in a circular shape when viewed in a top view, and is a component that changes the volume setting value of the voice chat sounds. The LEDs 3*b* to 3*h* are a display device provided along the periphery of the knob 3*a*, and are members displaying the sound setting value or the output level corresponding to the voice chat sounds. The knob 3*a* has the same configuration as the knob 2*a*, and the LEDs 3*b* to 3*h* have the same configuration as the LEDs 2*b* to 2*h*. Therefore, detailed descriptions thereof will be omitted.

In addition, the third operator 4 is a member for setting the volume setting value or the degree of the acoustic effect of the sounds from the game machine 60, and is provided with a knob 4*a* and LEDs 4*b* to 4*h*. The knob 4*a* is a rotation-type operator formed in a circular shape when viewed in a top view, and is a component that changes the volume setting value of the sounds from the game machine 60. The LEDs 4*b* to 4*h* are a display device provided along the periphery of the knob 4*a*, and are members displaying the sound setting value or the output level corresponding to the sounds from the game machine 60. The knob 4*a* has the same configuration as the knob 2*a*, and the LEDs 4*b* to 4*h* have the same configuration as the LEDs 2*b* to 2*h*. Therefore, detailed descriptions thereof will be omitted.

The target output destination button 5 is an operator for selecting the target output destination (i.e., the headset 50 or the distribution contents) for changing the sound setting values through the knobs 2*a* to 4*a* or displaying the sound setting values or the output levels through the LEDs 2*b* to 4*h* in the first to third operator 2 to 4. The operation of the target output destination button 5 is described with reference to (a) and (b) of FIG. 3.

(a) of FIG. 3 is a top view of the mixing device 1 in a case where the target output destination button 5 is OFF, and (b) of FIG. 3 is a top view of the mixing device 1 in a case where the target output destination button 5 is ON. In the embodiment, in the case where the target output destination button 5 is OFF, the headset 50 is set as the target output destination, and in the case where the target output destination button 5 is ON, the distribution contents are set as the target output destination.

Accordingly, in the case where the target output destination button 5 is OFF as shown in (a) of FIG. 3, by displaying the output levels, etc., corresponding to the headset 50 on the LEDs 2*b* to 4*h* and operating the knobs 2*a* to 4*a* in the state in which the target output button 5 is OFF, the respective sound setting values of the microphone sounds, the voice chat sounds, and the sounds from the game machine 60 corresponding to the headset 50 are changed.

Similarly, in the case where the target output destination button 5 is ON as shown in (b) of FIG. 3, by displaying the output levels, etc., corresponding to the distribution contents on the LEDs 2*b* to 4*h* and operating the knobs 2*a* to 4*a* in the state in which the target output button 5 is ON, the respective sound setting values of the microphone sounds, the voice chat sounds, and the sounds from the game machine 60 corresponding to the distribution contents are changed.

By selecting the target output destination by using the target output destination button 5 and operating the knobs 2*a* to 4*a*, the sound setting values of the selected target output destination corresponding to the knobs 2*a* to 4*a*, respectively, are set. In addition, the sound setting values set by the knobs 2*a* to 4*a* for each target output destination are applied to the microphone sounds, the voice chat sounds, and the sounds from the game machine 60, respectively, and the sounds to which the sound setting values are applied are mixed. The mixed sounds for each target output destination are output to each output destination.

According to the above, the change of the sound setting values and the selection of the target output destination for changing the sound setting values can be performed by the physical knobs 2*a* to 4*a* and target output destination button 5. Accordingly, compared with the case where the user H changes the target output destination and sets the sound setting values to the target output destination by using a display device and an input device, such as a mouse, (neither of which are shown herein) connected to the PC 70, the change and the setting can be carried out more intuitively.

In addition, the knobs 2*a* to 4*a* are configured to be rotatable limitlessly in the operation direction. Accordingly, for example, after the target output destination button 5 is set to OFF and the sound setting value of the headset 50 is increased by rotating the knob 2*a* rightward, even if the target output destination button 5 is set to ON and the knob 2*a* is rotated rightward to increase the sound setting value of the distribution contents, the rotation of the knob 2*a* is not stopped halfway. Accordingly, in the case where the setting of the sound setting values of the headset 50 and the setting of the sound setting values of the distribution contents are carried out continuously by using the same knobs 2*a* to 4*a*, the operability for the user H can be facilitated.

The link button 6 is an operator of switching between whether to set the sound setting values through operation of the knobs 2*a* to 4*a* at both target output destinations (i.e., the headset 50 and the distribution contents). In the case where the link button 6 is OFF, only the sound setting values of the target output destination selected by the target output destination button 5 are set in accordance with the operation of the knobs 2*a* to 4*a*.

Meanwhile, in the case where the link button 6 is ON, the respective sound setting values of the headset 50 and the distribution contents are set in accordance with the operation of the knobs 2*a* to 4*a*. Specifically, the variation amounts of the sound setting values in accordance with the operation of the knobs 2*a* to 4*a* are added to the respective sound setting values of the headset 50 and the distribution contents. In the case where the knobs 2*a* to 4*a* are rotated leftward, since the variation amounts of the sound setting values are negative, the sound setting values of each of the headset 50 and the distribution contents are reduced by the amounts of the absolute values of the variation amounts.

Accordingly, by setting the link button 6 to ON, the sound setting values of both of the headset 50 and the distribution contents are added by the same variation amount by operating the knobs 2*a* to 4*a* once. Accordingly, compared with the case where the sound setting values are changed while switching the output destination between the headset 50 and the distribution contents by using the target output destination button 5, the time and effort of the user H for changing the sound setting values can be omitted.

Meanwhile, even in the case where the link button 6 is set to ON, the sound setting value displayed by the LEDs 4*b* to 4*h* is only the sound setting value of the target output destination selected by the target output destination button 5. Accordingly, since the sound setting value of the one not selected by the target output destination button 5 is not displayed on the LEDs 4*b* to 4*h*, by setting the link button 6 to ON and operating the knobs 2*a* to 4*a*, the sound setting value not selected by the target output destination button 5 may exceed the upper limit or the lower limit.

Therefore, in the embodiment, when the link button 6 is set to ON and the knobs 2*a* to 4*a* are operated, in the case where any of the sound setting values of the headset 50 and the distribution contents exceeds the upper limit or the lower limit, it is configured to set none of the voice setting values (i.e., that is, the setting is performed until any of the sound setting values reaches the upper limit or the lower limit). Accordingly, the situation in which the sound setting value of the one not selected by the target output destination button 5 and not displayed by the LEDs 4*b* to 4*h* is set to exceed the upper limit or the lower limit can be suppressed, and the setting of the sound setting values of the headset 50 and the distribution contents can be performed within a suitable range.

In addition, by configuring to set none of the sound setting values in the case where any of the sound setting values of the headset 50 and the distribution contents exceeds the upper limit or the lower limit, in the case where any of the sound setting values exceeds the upper limit or the lower limit, the display of the LEDs 2*b* to 4*h* does not change even if the knobs 2*a* to 4*a* are operated. Accordingly, the user H can recognize that one of the sound setting values is set to reach the upper limit or lower limit through the display of the LEDs 2*b* to 4*h*.

The effect setting button 7 is an operator for switching a sound setting target (referred to as "target setting" in the following) displayed by the LEDs 4*b* to 4*h* to the volume setting value or the degree of the acoustic effect. In the case where the effect setting button 7 is ON, "acoustic effect degree" is set in the target setting, and in the case where the effect setting button is OFF, "volume setting value" is set in the target setting.

In particular, by setting the effect setting button 7 to ON to set the target setting set by the knobs 2*a* to 4*a* to "acoustic effect degree", and setting the degree of the acoustic effect to the lowest values (e.g., 0) by using the knobs 2*a* to 4*a*, the acoustic effect can be set to OFF. In addition, by setting the degrees of the acoustic effect by using the knobs 2*a* to 4*a* to a value greater than the lowest value, the acoustic effect can be set to ON, and the degree of such acoustic effect can be further adjusted by the knobs 2*a* to 4*a*.

The confirmation button 8 is an operator for switching whether to also output the sounds mixed for the distribution contents to the headset 50. In the case where the confirmation button 8 is ON, the sounds mixed for the distribution contents are also output to the headset 50. Meanwhile, in the case where the confirmation button 8 is OFF, the sounds originally mixed for the headset 50 are output to the headset 50. By setting the confirmation button 8 to ON, in place of the sounds originally mixed for the headset 50, the sounds mixed for the distribution contents can be confirmed by using the headset 50. Therefore, the user H can listen to such sounds while changing/adjusting the sound setting values of the distribution contents by using the knobs 2*a* to 4*a*.

It may also be that the target output destination button 5 is provided with a function same as the confirmation button 8 and the confirmation button 8 is omitted from the mixing device 1. Specifically, it may also be that, in the case where the target output destination button 5 is OFF, the sounds mixed for the headset 50 are output from the headset 50, and in the case where the target output destination button 5 is ON, the sounds mixed for the distribution contents are output from the headset 50.

In the following, functions of the mixing device 1 are described with reference to FIG. 4. FIG. 4 is a functional block diagram of the mixing device 1. As shown in FIG. 4, the mixing device 1 has an input unit 300, multiple output units 301, a sound setting operator 302, a selection operator 303, a setting value acquisition unit 304, and a mixing unit 305.

The input unit 300 inputs sounds, and is realized by a CPU 10, a sound input/output device 15, and an external input/output device 16 to be described afterwards in FIG. 5. The output unit 301 outputs sounds, and is realized by the sound input/output device 15 and the external input/output device 16. The sound setting operator 302 is an operator for setting the sound setting values and realized by the knobs 2*a* to 4*a*. The selection operator 303 is an operator for selecting the output unit 301*a* of the target for setting the sound setting value and realized by the target output destination setting button 5.

The setting value acquisition unit 304 acquires the sound setting values set by the sound setting operator 302 with respect to the output unit 301 selected by the selection operator 303 and realized by the CPU 10. The mixing unit 305, for each output unit 301, mixes the sounds input at the input unit 300 based on the sound setting values corresponding to the output unit 301 and being sound setting values acquired by the setting value acquisition unit 304, and is realized by the CPU 10.

That is, the selection of the output unit 301 as the target of setting the sound setting values and the setting of the sound setting values with respect to the output unit 301 are performed by the selection operator 303 and the sound setting operator 302 that are physical operators. Accordingly, the user H can intuitively select the output unit 301 of the target of setting these sound setting values and set the sound setting values.

In the following, the electrical configuration of the mixing device 1 is described with reference to FIGS. 5 and 6. FIG. 5 is a block diagram illustrating an electrical configuration of the mixing device 1. The mixing device 1 is provided with the CPU 10, a flash ROM 11, and a RAM 12. The CPU 10, the flash ROM 11, and the RAM 12 are respectively connected to an input/output port 14 via bus lines 13. The input/output port 14 is further connected to the first operator 2, the second operator 3, the third operator 4, the target output destination button 5, the link button 6, the effect setting button 7 and the confirmation button 8, the sound input/output device 15, and the external input/output device 16.

The CPU 10 is an arithmetic device controlling each unit connected by the bus line 13. The flash ROM 11 is a rewritable non-volatile storage device storing a program executed by the CPU 10 and fixed value data, etc., and includes a control program 11*a* and a setting value table 11*b*. When the control program 11*a* is executed in the CPU 10, a main process of FIG. 7 is executed. The setting value table 11*b* is described with reference to FIG. 6.

FIG. 6 is a diagram schematically illustrating the setting value table 11*b*. As shown in FIG. 6, in the setting value table 11*b*, the sound setting values (i.e., the volume setting value and the degree of the acoustic effect) are stored for each combination of the first to third operators 2 to 4 and the target output destinations (i.e., the distribution contents or the headset 50).

Referring to FIG. 5 again, the RAM 12 includes a memory rewritably storing various work data or flags when the CPU 10 executes the control program 11*a*, a target output destination memory 12*a* storing the target output destinations, and a target setting memory 12*b* storing the target settings of the sound settings.

The sound input/output device 15 is a device that inputs sounds from the microphone of the headset 50 and outputs sounds to the headphone of the headset 50. The external input/output device 16 is a device for communication with an external machine, and is connected with the PC 70. The voice chat sounds or the sounds from the game machine 60 connected to the PC 70 are input to the mixing device 1 from the PC 70 via the external input/output device 16. At this time, the sounds from the game machine 60 and the voice chat sounds are input separately from the external input/output device 16. In addition, the mixed sounds for the distribution contents from the mixing device 1 are output to the PC 70 via the external input/output device 16.

In the following, the processes executed by the CPU 10 are described with reference to FIGS. 7 to 9. FIG. 7 is a flowchart of a main process. The main process is a process executed by the CPU 10 after the power of the mixing device 1 is turned on.

In the main process, firstly, whether the target output destination button 5 is OFF is confirmed (S1). In the case where the target output destination button 5 is OFF (S1: YES) in the process of S1, the target output destination memory 12*a* is set to "headset 50" (S2). Meanwhile, in the case where the target output destination button 5 is OFF (S1: NO) in the process of S1, the target output destination memory 12*a* is set to "distribution contents" (S3).

After the processes of S2, S3, whether the effect setting button 7 is ON is confirmed (S4). In the case where the effect setting button 7 is ON (S4: YES) in the process of S4, the target setting memory 12*b* is set to "acoustic effect degree" (S5). Meanwhile, in the process of S4, in the case where the effect setting button 7 is OFF (S4: NO), the target setting memory 12*b* is set to "volume" (S6).

After the processes of S5, S6, the sounds from the game machine 60 and the voice chat sounds are acquired from the PC 70, and the microphone sounds are acquired from the headset 50 (S7). After the process of S7, the sounds in which the sound setting values of the setting value table 11*b* are applied to the sounds from the game machine 60, the voice chat sounds, and the microphone sounds are generated (S8).

Specifically, the sounds in which the sound setting values of the first operator 2 corresponding to the distribution contents are obtained from the setting value table 11 and the acquired sound setting values are applied to the microphone sounds, that is, the sounds in which the sound setting value ("30" in FIG. 6) of the first operator 2 corresponding to the distribution contents is applied to the microphone sounds and the acoustic effect based on the degree of the acoustic effect ("20" in FIG. 6) of the first operator 2 corresponding to the distribution contents is further applied to such sounds, are generated. In addition, the sound setting values of the first operator 2 corresponding to the headset 50 are acquired from the setting value table 11*b*, and the sounds in which the sound setting values that are acquired are applied to the microphone sounds are generated.

Similarly, the sound setting values of the second operator 3 corresponding to the distribution contents and the sound setting values of the second operator 3 corresponding to the headset 50 are acquired from the setting value table 11*b*, and the sounds in which the sound setting values that are respectively acquired are applied to the voice chat sounds are generated respectively. In addition, the sound setting values of the third operator 4 corresponding to the distribution contents and the sound setting values of the third operator 4 corresponding to the headset 50 are acquired from the setting value table 11*b*, and the sounds in which the sound setting values that are respectively required are applied to the sounds of the game machine 60 are generated respectively.

After the process of S8, a level display process (S9) is executed, and then a sound output process (S10) is executed. The level display process and the sound output process are described with reference to FIG. 8.

(a) of FIG. 8 is a flowchart of the level display process. In the level display process, firstly, among the sounds generated in the process of S8 of FIG. 7, the output levels of the sounds corresponding to the target output destination of the target output destination memory 12*a* are respectively acquired (S20). After the process of S20, the output levels of the sounds that are acquired are respectively displayed on the LEDs 2*b* to 4*h* of the first to third operators 2 to 4 (S21), and the level display process ends.

(b) of FIG. 8 is a flowchart of the sound output process. In the sound output process, firstly, whether the confirmation button 8 is ON is confirmed (S30). In the case where the confirmation button 8 is ON (S30: YES) in the process of S30, among the sounds generated in the process of S8 of FIG. 7, the sounds corresponding to the distribution contents are acquired, mixed, and respectively output to the PC 70 and the headset 50 (S31). Accordingly, in the headset 50 as well, the sounds output in the distribution contents are also output.

Meanwhile, in the case where the confirmation button 8 is OFF (S30: NO) in the process of S30, among the sounds generated in the process of S8, the sounds corresponding to the distribution contents are acquired, mixed, and output to the PC 70 (S32). After the process of S32, among the sounds generated in the process of S8, the sounds corresponding to the headset 50 are acquired, mixed, and output to the headset 50 (S33). After the processes of S31 and S33, the sound output process ends.

Here, as noted above, it may also be that the confirmation button 8 is omitted from the mixing device 1, and the sounds output to the headset 50 are switched in accordance with the setting state of the target output button 5. Specifically, in the case where the target output destination button 5 is ON in the process of S30, the process of S31 is performed, and in the case where the target output destination button 5 is OFF in the process of S30, the processes of S32 and S33 are performed.

Referring to FIG. 7 again, after the sound output process of S10, whether any of the knobs 2*a* to 4*a* of the first to third operators 2 to 4 is operated is confirmed (S11). In the case where any of the knobs 2*a* to 4*a* is operated (S11: YES) in the process of S11, an operation process (S12) is executed. The operation process is described with reference to FIG. 9.

FIG. 9 is a flowchart of the operation process. In the operation process, firstly, the display of the LEDs 2*b* to 4*h* corresponding to the knobs 2*a* to 4*a* that are operated is changed from the output levels to the sound setting values of the target setting of the target setting memory 12*b* of the target output destination of the target output destination memory 12*a* corresponding to the knobs 2*a* to 4*a* (S40).

Specifically, the knobs 2*a* to 4*a* that are operated are specified, and the sound setting values of the target setting of the target setting memory 12*b* of the target output destination of the target output destination memory 12*a* corresponding to such knobs 2*a* to 4*a* are acquired from the setting value table 11*b*, and the acquired sound setting value that is acquired is displayed on the LEDs 2*b* to 2*h*.

After the process of S40, whether the display of the LEDs 2*b* to 4*h* is switched from the output levels to the sound setting values of the target setting of the target output destination through the process of S40 is confirmed (S41). In the case where the display of the LEDs 2*b* to 4*h* is not switched from the output levels to the sound setting values of the target setting of the target output destination (S41: NO) in the process of S41, the process of S41 is repeated. Accordingly, during the period until the display of the LEDs 2*b* to 4*h* is switched from the output levels to the sound setting values of the target setting of the target output destination, a change of the sound setting values by operating the knobs 2*a* to 4*a* is not accepted.

Meanwhile, in the case where the display of the LEDs 2*b* to 4*h* is switched from the output levels to the sound setting values in the target setting of the target output destination (S41: YES), the operation amounts of the knobs 2*a* to 4*a* after the display of the LEDs 2*b* to 4*h* is switched are acquired (S42). After the process of S42, the variation amounts of the target setting of the target setting memory 12*b* of the target output destination of the target output destination memory 12*a* corresponding to the acquired operation amounts are calculated (S43).

After the process of S43, whether the link button 6 is ON is confirmed (S44). In the case where the link button 6 is ON in the process of S44 (S44: YES), the sound setting values of the target setting of the target setting memory 12*b* of the distribution contents for the first to third operators 2 to 4 in which the knobs 2*a* to 4*a* are operated are acquired. The variation amounts calculated in the process of S43 are added to the acquired sound setting values (S45).

After the process of S45, the sound setting values of the target setting of the target setting memory 12*b* of the headset 50 for the first to third operators 2 to 4 in which the knobs 2*a* to 4*a* are operated are acquired. The variation amounts calculated in the process of S43 are added to the acquired sound setting values (S46).

After the process of S46, whether any of the sound setting values added in the processes of S45, S46 exceeds the upper limit or the lower limit of the target setting in the target setting memory 12*b* is confirmed (S47). Specifically, whether any of the sound setting values added in the processes of S45, S46 becomes a value greater than the upper limit of the target setting from a value equal to or less than the upper limit of the target setting or whether any of the sound setting values added in the processes of S45, S46 becomes a value less than the lower limit of the target setting from a value equal to or greater than the lower limit of the target setting is confirmed.

In the case where none of the sound setting values added in the processes of S45, S46 exceeds the upper limit or the lower limit of the target setting in the target setting memory 12*b* in the process of S47 (S47: NO), the sound setting values added in the processes of S45, S46 are respectively stored in the corresponding regions of the setting value table 11*b*. Meanwhile, in the case where any of the sound setting values added in the processes of S45, S46 exceeds the upper limit or the lower limit of the target setting in the target setting memory 12*b* in the process of S47 (S47: YES), the process of S48 is skipped.

Accordingly, in the case where the link button 6 is ON, the corresponding sound setting values of the headset 50 and the distribution contents can be changed at the same time by operating the knobs 2*a* to 4*a*. Meanwhile, in the case where any of the sound setting values of the headset 50 and the distribution contents exceeds the upper limit or the lower limit, none of the sound setting values is changed.

Meanwhile, in the case where the link button 6 is OFF (S44: NO) in the process of S44, the sound setting values corresponding to the target setting of the target setting memory 12*b* of the target output destination of the target output memory 12*a* for the first to third operators 2 to 4 in which the knobs 2*a* to 4*a* are operated are acquired from the setting value table 11*b*. The variation amounts calculated in the process of S43 are added to the acquired sound setting values (S49).

After the process of S49, whether the sound setting values added in the process of S49 exceed the upper limit or the lower limit of the target setting of the target setting memory 12*b* of the target output destination of the target output destination memory 12*a* is confirmed (S50). In the case where the sound setting values added in the process of S49 do not exceed the upper limit or the lower limit of the target setting of the target output destination in the process of S50 (S50: NO), the sound setting values added in the process of S49 are stored in the corresponding region of the setting value table 11*b* (S51). Meanwhile, in the case where the sound setting values added in the process of S49 exceed the upper limit or the lower limit of the target setting of the target output destination (S50: YES), the process of S51 is skipped.

After the processes of S47, S48, S50, S51, the sound setting values corresponding to the target setting of the target setting memory 12*b* of the target output destination of the target output destination memory 12*a* for the first to third operators 2 to 4 in which the knobs 2*a* to 4*a* are operated are acquired from the setting value table 11*b*, and the acquired sound setting values are displayed on the corresponding LEDs 2*b* to 4*h* (S52).

Referring to FIG. 7 again, in the process of S11, in the case where none of the knobs 2*a* to 4*a* is operated (S11: NO), the operation process of S12 is skipped. After the processes of S11 and S12, the processes following S1 are repeated.

Although the above has been described based on the above embodiment, it can be easily inferred that various improvements and modifications are possible.

In the above embodiment, the rotation-type knobs 2*a* to 4*a* are shown as as operators (sound setting operators) for changing the sound setting values. However, the invention is not limited thereto. For example, as shown in a mixing device 500 shown in (a) of FIG. 10, the sound setting operator may also be configured as a slider-type operator 20*a* in which a knob is operated in an upper-lower direction. In such case, LEDs 20*b* to 20*h* may be arranged in the operation direction of the operator 20*a*, i.e., the upper-lower direction.

In addition, as shown in a mixing device 501 shown in (b) of FIG. 10, the sound setting operator may also be formed by an upper button 20*au*, which increases the sound setting value, and a lower button 20*ad*, which decreases the sound setting value. Furthermore, as shown in a mixing device 502 shown in (c) of FIG. 10, the sound setting operator may also be configured a rotation-type operator 22*a* in which numerical values of 0 to 9, etc., are assigned in advance. In such case, a value (e.g., a value obtained by multiplying the numerical value by a predetermined coefficient) in accordance with the numerical value located at the front surface in the operator 22*a* (e.g., "2" in the operator 22*a* in (c) of FIG. 10) is acquired as the sound setting value. It is noted that the operator 22*a* is not limited to being assigned numerical values. For example, letters, such as A, B, C, may be assigned to the operator 22*a*, and the sound setting value of a value in accordance with the letter located on the front surface in the operator 22*a* may be acquired.

In addition, the sound setting operator is not limited to being formed by a knob, but may also be configured as a touch panel. At this time, for example, it may also be that in the case where an upward swipe is input to the touch panel, the sound setting value is increased, and in the case where a downward swipe is input to the touch panel, the sound setting value is creased.

In the above embodiment, the microphone sounds, the voice chat sounds, and the sounds of the game machine 60 are respectively assigned to the first to third operators 2 to 4. However, the invention is not limited thereto. For example, it may also be that the voice chat sounds are assigned to the first operator 2, the microphone sounds are assigned to the second operator 3, and the sounds of the game machine 60 are assigned to the third operator 4.

In addition, an operator, etc., which switches the sound input destinations assigned to the first to third operators 2 to 4 may also be provided. In addition, the input destinations assigned to the first to third operators 2 to 4 may be switched in accordance with an instruction from the PC 70. In such case, a control signal under the standard of musical instrument digital interface (MIDI) may be adopted, as an example, as the control signal used for the instruction from the PC 70.

Moreover, the sounds mixed by the mixing device 1 are not limited to sounds from the microphone sounds, the voice chat sounds, and the sounds from the game machine 60. For example, in place of the microphone sounds, the sounds of music reproduced by a music player may be used, or the musical tones played by an electronic musical instrument may be used. In such case, the sounds of music reproduced by a music player or the musical tones played by an electronic musical instrument in place of the microphone sounds may be assigned to the first to third operators 2 to 4. Similarly, in place of the voice chat sounds or the sounds from the game machine 60, the sounds input from another application software executed by the PC 70 or another device may also be used. For example, in place of the game machine 60, a game application software (referred to as "game application" in the following) may be mounted to the PC 70, and the sounds during game play of the game application executed by the PC 70 may be used.

Moreover, in the above embodiment, three operators, which are the first to third operators 2 to 4, are provided in the mixing device 1. However, the invention is not limited thereto. The number of operators provided in the mixing device 1 is in accordance with the number of types of sounds input to the mixing device 1, and may be 2 or fewer or 4 or more.

In the above embodiment, in the case where the target output destination button 5 is OFF, the headset 50 is set as the target output destination, and in the case where the target output destination button 5 is ON, the distribution contents are set as the target output destination. However, the invention is not limited thereto. It may also be that the headset 50 is set as the target output destination in the case where the target output destination button is ON, and the distribution contents are set as the target output destination in the case where the target output destination button is OFF. Also, in place of the target output destination button 5, it may also be that a selection operator (e.g., a rotary switch) selecting one output destination from multiple output destinations is provided, and the output destination selected by the selection operator is set as the target output destination. In such case, by including output destinations other than the headset 50 and the distribution contents as output destinations selectable by the selection operator, the sound setting values with respect to the output destinations other than the headset 50 and the distribution contents can also be changed, and the output levels of the output destinations other than the headset 50 and the distribution contents can also be displayed.

In the above embodiment, it is configured that, when the link button 6 is set to ON and the knobs 2*a* to 4*a* are operated, in the case where the sound setting values of any of the headset 50 and the distribution contents exceed the upper limit or the lower limit, the setting of the sound setting values is performed for none of the headset 50 and the distribution contents. However, the invention is not limited thereto. When the link button 6 is set to ON and the knobs 2*a* to 4*a* are operated, in the case where the sound setting values of any of the headset 50 and the distribution contents exceed the upper limit or the lower limit, it may also be that the setting is not carried out for the one whose sound setting values exceed the upper limit or the lower limit, while the setting continues for the one whose sound setting values do not exceed the upper limit or the lower limit until reaching the upper limit or the lower limit of the sound setting value.

In the above embodiment, the headset 50 is exemplified as a component connected to the mixing device 1, but the invention is not limited thereto. The microphone and the headphone may be set as separate devices, and, in place of the headphone, a speaker may be used.

In the above embodiment, the output levels and the sound setting values are switchably displayed on the LEDs 2*a* to 4*h*. However, the invention is not limited thereto. For example, it may also be that the LEDs for the output levels and the LEDs for the sound setting values are provided separately, and the output levels and the sound setting values are displayed at the same time. In addition, the display device is not limited to LEDs. It may also be that a 7-segment LED is used as the display device, and a numerical value corresponding to the magnitude of the output level or the sound setting value is displayed on the 7-segment LED.

Furthermore, the display device may also be a liquid crystal display (LED) provided on the outer circumferences of the knobs 2*a* to 4*a*. In such case, a rod-shaped display part with a length in accordance with the magnitude of the output level or the sound setting value may be displayed on the LCD, or a color in accordance with the magnitude of the output level or the sound setting value may be displayed (e.g., displaying blue when the output level, etc., is low and displaying red when the output level, etc., is high). In addition, a numerical value or a letter (e.g., A, B, C, . . . , in the order of the magnitude of the output level, etc.) of the magnitude of the output level or the sound setting value may be displayed on the LCD.

In the above embodiment, the acoustic effects are set to OFF by setting the degrees of the acoustic effect to the lowest value by using the knobs 2*a* to 4*a*. However, the invention is not limited thereto. For example, a button for switching between ON and OFF of the acoustic effect may be provided for each of the first to third operators 2 to 4 and, in accordance with the state of such button, the ON/OFF of the acoustic effect to the corresponding microphone sounds, voice chat sounds, or sounds of the game machine 60 may be switched individually.

In the above embodiment, it is configured that, at the time of operating the knobs 2*a* to 4*a*, it is possible to change the sound setting values by using the knobs 2*a* to 4*a* after the display of the LEDs 2*b* to 4*h* is switched from the output levels to the sound setting values. However, the invention is not limited thereto. It may also be that the sound setting values are changed in accordance with the operation of the knobs 2*a* to 4*a*, regardless of the display of the LEDs 2*b* to 4*h*.

In addition, it may also be that it is possible to change the sound setting values after a predetermined time (e.g., after 0.5 seconds) following the switching of the display of the LEDs 2*b* to 4*h* from the output levels to the sound setting values. Accordingly, that a sound setting value unexpected by the user H is set can be more suitably suppressed. In addition, by setting the display of the LEDs 2*b* to 4*h* immediately after the display of the LEDs 2*b* to 4*h* is switched from the output levels to the sound setting values to a display mode (e.g., a lighting color "red"), and setting the display of the LEDs 2*b* to 4*h* after a predetermined time since then to another display mode (e.g., a lighting color "blue"), the user H is notified of the information that it is possible to change the sound setting value.

In the above embodiment, in the processes of S41 to S43 in (b) of FIG. 8, in the case where the confirmation button 8 is ON, instead of the sounds corresponding to the headset 50, the sounds corresponding to the distribution contents are output to the headset 50. However, the invention is not limited thereto. For example, in the case where the confirmation button 8 is ON, it may also be that the sounds corresponding to the headset 50 and the sounds corresponding to the distribution contents are both output to the headset 50.

At this time, the sounds corresponding to the headset 50 may be output to a right channel (a channel corresponding to the right ear) in the headphone of the headset 50, and the sounds corresponding to the distribution contents may be output to a left channel (a channel corresponding to the left ear) in the headphone of the headset.

In the above embodiment, the mixing device 1 is configured as being connected to the PC 70 to which the game machine 60 is connected. However, the invention is not limited thereto. For example, it may also be that, in place of the game machine 60, an electronic apparatus that outputs other sounds, such as a musical electronic instrument, is connected to the PC 70, and the sounds output by the electronic musical instrument, etc., are mixed by the mixing device 1. In addition, it may also be that the PC 70 is omitted, and the mixing device 1 is directly connected to the game machine 60 or the electronic musical instrument, etc.

In the above embodiment, the control program 11*a* is executed by the mixing device 1. However, the invention is not limited thereto. For example, the control program 11*a* may also be executed by the PC 70 or an information processing device (computer), such as the PC 70 or a portable terminal, etc. In such case, it may also be that the first to third operators 2 to 4, the target output destination button 5, the link button 6, the effect setting button 7, and the confirmation button 8 are provided in the information processing device executing the control program 11*a*.

What is claimed is:

1. A mixing device, comprising:

a plurality of input units comprising a first input unit inputting a first sound and a second input unit inputting a second sound;

a plurality of output units comprising a first output unit outputting a first mixed sound and a second output unit outputting a second mixed sound;

a plurality of sound setting operators corresponding to the plurality of input units, comprising:

a first sound setting operator setting two first sound setting values that are first setting values relating to the first sound, wherein one of the two first sound setting values is for the first output unit and the other one of the two first sound setting values is for the second output unit; and a second sound setting operator setting two second sound setting values that are second setting values relating to the second sound, wherein one of the two second sound setting values is for the first output unit and the other one of the two second sound setting values is for the second output unit;

a selection operator, selecting one of the output units as a target output unit for setting one of the first sound setting values and one of the second sound setting values;

a setting value acquisition means, acquiring the one of the first sound setting values set by the first sound setting operator and the one of the second sound setting values set by the second sound setting operator with respect to the target output unit selected by the selection operator; and a mixing means, for each of the output units, mixing the first sound input at the first input unit and the second sound input at the second input unit as the first mixed sound or the second mixed sound based on one of the first sound setting values and one of the second sound setting values for a corresponding output unit, wherein the one of the first sound setting values and the one of the second sound setting values are acquired by the setting value acquisition means, wherein the mixing device is provided with a plurality of display units corresponding to the plurality of sound setting operators and comprises:

a first display unit in which a first display based on the one of the first sound setting values corresponding to the one of the output units selected by the selection operator is displayed along an operation direction of the first sound setting operator; and a second display unit in which a second display based on the one of the second sound setting values corresponding to the one of the output units selected by the selection operator is displayed along an operation direction of the second sound setting operator.

2. The mixing device as claimed in claim 1, wherein each of the plurality of sound setting operators is formed by a knob of a rotation type, the knob is configured to be able to limitlessly rotate in an operation direction of the knob.

3. The mixing device as claimed in claim 1, wherein the first display based on the one of the first sound setting values or an output level of the first sound in which the one of the first sound setting values is applied to the first sound input at the first input unit is displayed on the first display unit.

4. The mixing device as claimed in claim 3, wherein, on the first display unit, a region for displaying the first display based on the one of the first sound setting values and a region for displaying the first display based on the output level of the first sound are the same, and in a state in which the first display based on the output level of the first sound is being displayed on the first display unit, in a case where the first sound setting operator is operated, the first display of the first display unit is changed from the first display based on the output level of the first sound to the first display based on the one of the first sound setting values.

5. The mixing device as claimed in claim 3, in the state in which the first display based on the output level of the first sound is being displayed on the first display unit, in a case where the first sound setting operator is operated, during a period in which the first display of the first display unit is switched from the first display based on the output level of the first sound to the first display based on the one of the first sound setting values, setting of the first sound setting values by operating the first sound setting operator is not accepted.

6. The mixing device as claimed in claim 1, wherein the first sound setting values corresponding to the output units are changed by operating the first sound setting operator.

7. The mixing device as claimed in claim 6, wherein in a case where the first sound setting operator is operated, and one of the first sound setting values corresponding to any of the output units exceeds an upper limit or a lower limit through operation of the first sound setting operator, none of the first sound setting values corresponding to the output units is changed.

8. The mixing device as claimed in claim 1, wherein a sound output to one of the output units is also output to another one of the output units.

9. The mixing device as claimed in claim 1, wherein the first sound setting values are volume setting values of the first sound.

10. The mixing device as claimed in claim 1, wherein the first sound setting values are degrees of acoustic effects applied to the first sound.

11. A mixing method, executed by a mixing device comprising: a plurality of input units comprising a first unit inputting a first sound and a second input unit inputting a second sound; a plurality of output units comprising a first output outputting a first mixed sound and a second output unit outputting a second mixed sound; a plurality of sound setting operators corresponding to the plurality of input units, comprising a first sound setting operator setting two first sound setting values that are setting values relating to the first sound, and a second sound setting operator setting two second sound setting values that are second setting values relating to the second sound; and a selection operator, selecting one of the output units as a target output unit for setting one of the first sound setting values and one of the second sound setting values, wherein the mixing method comprises:

a setting step of setting the two first sound setting values by the first sound setting operator and setting the two second sound setting values by the second sound setting operator, wherein one of the two first sound setting values is for the first output unit and the other one of the two first sound setting values is for the second output unit, and one of the two second sound setting values is for the first output unit and the other one of the two second sound setting values is for the second output unit;

a setting value acquisition step of acquiring the one of the first sound setting values set by the first sound setting operator and the one of the second sound setting values set by the second sound setting operator with respect to the target output unit selected by the selection operator; and a mixing step of, for each of the output units, mixing the first sound input at the first input unit and the second sound input at the second input unit as the first mixed sound or the second mixed sound based on one of the first sound setting values and one of the second sound setting values for a corresponding output unit, wherein the one of the first sound setting values and the one of the second sound setting values are acquired at the setting value acquisition step, wherein the mixing method further comprises:

displaying a first display based on the one of the first sound setting values corresponding to the one of the output units selected by the selection operator, wherein the first display is the one of the first sound setting values corresponding to the first sound setting operator along an operation direction of the first sound setting operator; and displaying a second display based on the one of the second sound setting values corresponding to the one of the output units selected by the selection operator, wherein the second display is the one of the second sound setting values corresponding to the second sound setting operator along an operation direction of the second sound setting operator.

12. The mixing method as claimed in claim 11, further comprising providing a knob of a rotation type as each of the plurality of sound setting operators, wherein the knob is configured to be able to limitlessly rotate in an operation direction of the knob.

13. The mixing method as claimed in claim 11, wherein the first display is based on the one of the first sound setting values or an output level of the first sound in which the one of the first sound setting values is applied to the first sound input at the first input unit.

14. The mixing method as claimed in claim 13, wherein a region for displaying the first display based on the one of the first sound setting values and a region for displaying the first display based on the output level of the first sound are the same, and in a case where the first sound setting operator is operated while the first display based on the output level of the first sound is being displayed, the first display is changed from being based on the output level of the first sound to being based on the one of the first sound setting values.

15. The mixing method as claimed in claim 13, further comprising not accepting setting of the first sound setting values by operating the first sound setting operator during a period for switching the first display from being based on the output level of the first sound to being based on the one of the first sound setting values in a case where the first sound setting operator is operated in the state in which the first display based on the output level of the first display is being displayed.

16. The mixing method as claimed in claim 11, wherein the first sound setting values corresponding to the output units are changed by operating the first sound setting operator.

17. The mixing method as claimed in claim 16, wherein in a case where the first sound setting operator is operated, and one of the first sound setting values corresponding to any of the output units exceeds an upper limit or a lower limit through operation of the first sound setting operator, none of the first sound setting values corresponding to the output units is changed.

18. The mixing method as claimed in claim 11, wherein a sound output to one of the output units is also output to another one of the output units.

* * * * *